US008910807B2

(12) United States Patent
Wernecke et al.

(10) Patent No.: US 8,910,807 B2
(45) Date of Patent: Dec. 16, 2014

(54) COMPRESSIBLE STOP MEMBER FOR USE ON A CRANE

(75) Inventors: Charles R. Wernecke, Manitowoc, WI (US); Timothy J. Albinger, Manitowoc, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 779 days.

(21) Appl. No.: 12/781,339

(22) Filed: May 17, 2010

(65) Prior Publication Data

US 2010/0294736 A1 Nov. 25, 2010

Related U.S. Application Data

(60) Provisional application No. 61/179,935, filed on May 20, 2009.

(51) Int. Cl.
B66C 23/92 (2006.01)
F16F 9/06 (2006.01)

(52) U.S. Cl.
CPC .................. *B66C 23/92* (2013.01); *F16F 9/061* (2013.01)
USPC ............................. 212/293; 267/127; 188/317

(58) Field of Classification Search
USPC .......... 212/293, 238, 261, 349; 188/288, 313, 188/297, 316, 300; 267/64.15, 64.25, 64.26
See application file for complete search history.

(56) References Cited

U.S. PATENT DOCUMENTS 3,820,772 A * 6/1974 Kerr et al. ..................... 267/116
3,868,022 A * 2/1975 Greenlay et al. .............. 212/291
4,010,852 A * 3/1977 Goss et al. .................... 212/262
4,145,959 A    3/1979 Burden et al.
4,194,638 A * 3/1980 Morrow et al. ............... 212/239
4,632,228 A * 12/1986 Oster et al. ................. 188/282.1
4,658,970 A * 4/1987 Oliphant ...................... 212/294
5,484,069 A * 1/1996 Lanning ....................... 212/270

(Continued)

FOREIGN PATENT DOCUMENTS

GB   2 314 550 A   1/1998
JP   A 1975-032696   9/1975

(Continued)

OTHER PUBLICATIONS

Machine Translation of JP 09177127 A.*

(Continued)

*Primary Examiner* — Sang Kim
*Assistant Examiner* — Nathaniel Adams
(74) *Attorney, Agent, or Firm* — Brinks Gilson & Lione

(57) ABSTRACT

A compressible stop member for use on a crane includes: a housing having a first sealed end, a second end, a first cylindrical surface and a second cylindrical surface; a free piston slidably contained within the housing in a sealing engagement with the first cylindrical surface; a compressed gas chamber in the housing between the free piston and the first sealed end; and a rod comprising a cylindrical portion with a diameter less than the diameter of the second cylindrical surface and a rod support portion that separates a first liquid chamber comprising the volume inside the housing between the free piston and the rod support portion from a second liquid chamber comprising the volume between the rod support portion and the second end of the housing. Also, the rod support portion includes at least one flow channel allowing liquid to flow between the first and second liquid chambers.

21 Claims, 9 Drawing Sheets

(56) References Cited

U.S. PATENT DOCUMENTS

| | | | |
|---|---|---|---|
| 5,676,264 | A | 10/1997 | Wilson |
| 6,286,640 | B1 | 9/2001 | Bertrand et al. |
| 6,296,092 | B1 | 10/2001 | Marking et al. |
| 6,863,163 | B2 * | 3/2005 | Oliver et al. ............... 188/315 |
| 7,322,377 | B2 | 1/2008 | Baltes |
| 7,464,799 | B2 | 12/2008 | Kojima et al. |
| 2003/0116897 | A1 * | 6/2003 | Knapp ................. 267/64.12 |
| 2008/0223673 | A1 | 9/2008 | Sawai et al. |
| 2008/0230135 | A1 | 9/2008 | Weber |

FOREIGN PATENT DOCUMENTS

| | | |
|---|---|---|
| JP | A 1978-079166 | 7/1978 |
| JP | U 1984-177842 | 11/1984 |
| JP | A 1985-193392 | 12/1985 |
| JP | A 1986-178398 | 8/1986 |
| JP | 8 295493 A | 11/1996 |
| JP | 09177127 A * | 7/1997 |
| JP | A 1998-157982 | 6/1998 |
| JP | A 2000-501163 | 2/2000 |
| JP | A 2004-359180 | 12/2004 |
| JP | A 2008-001443 | 1/2008 |
| JP | A 2008-223849 | 9/2008 |

OTHER PUBLICATIONS

Drawings of "Accumulator Strut Stop—16000 luffing jib"—Manitowoc Cranes, Inc. (3 pgs redacted) undated, but prior to May 29, 2008.

Drawings of "18000 Mast Stop Assembly"—Manitowoc Cranes, Inc. (4 pgs redacted) undated but prior to May 29, 2008.

* cited by examiner

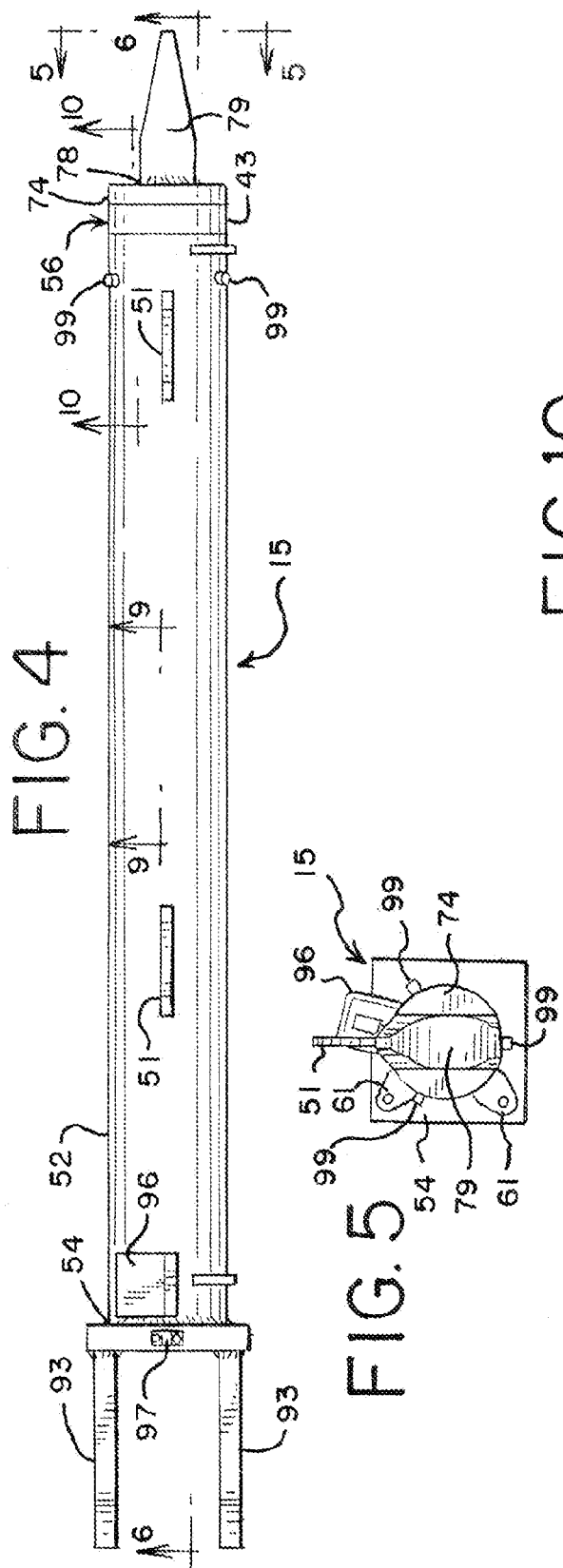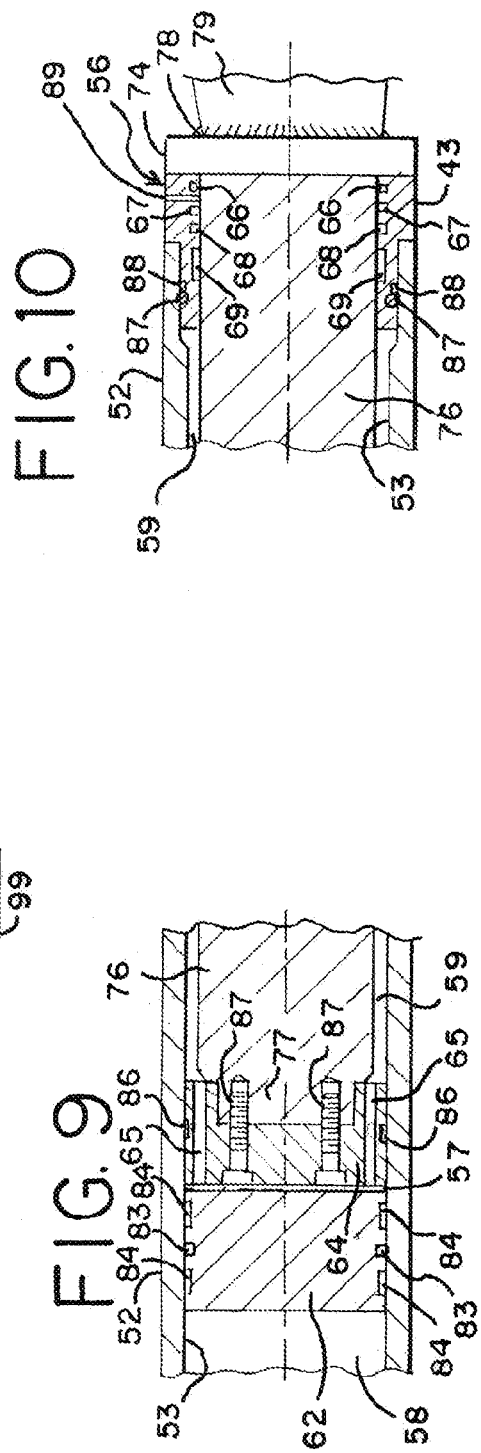

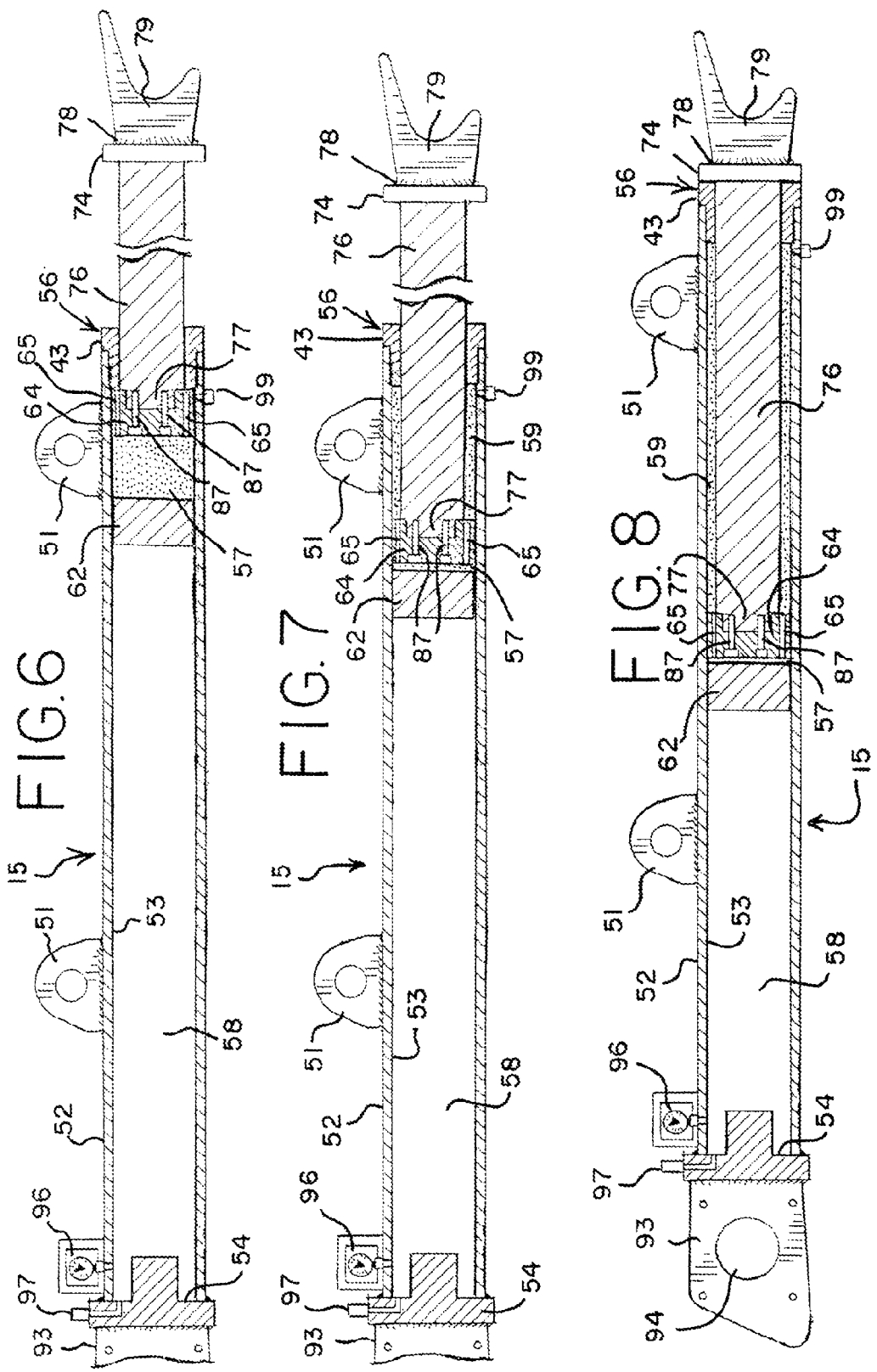

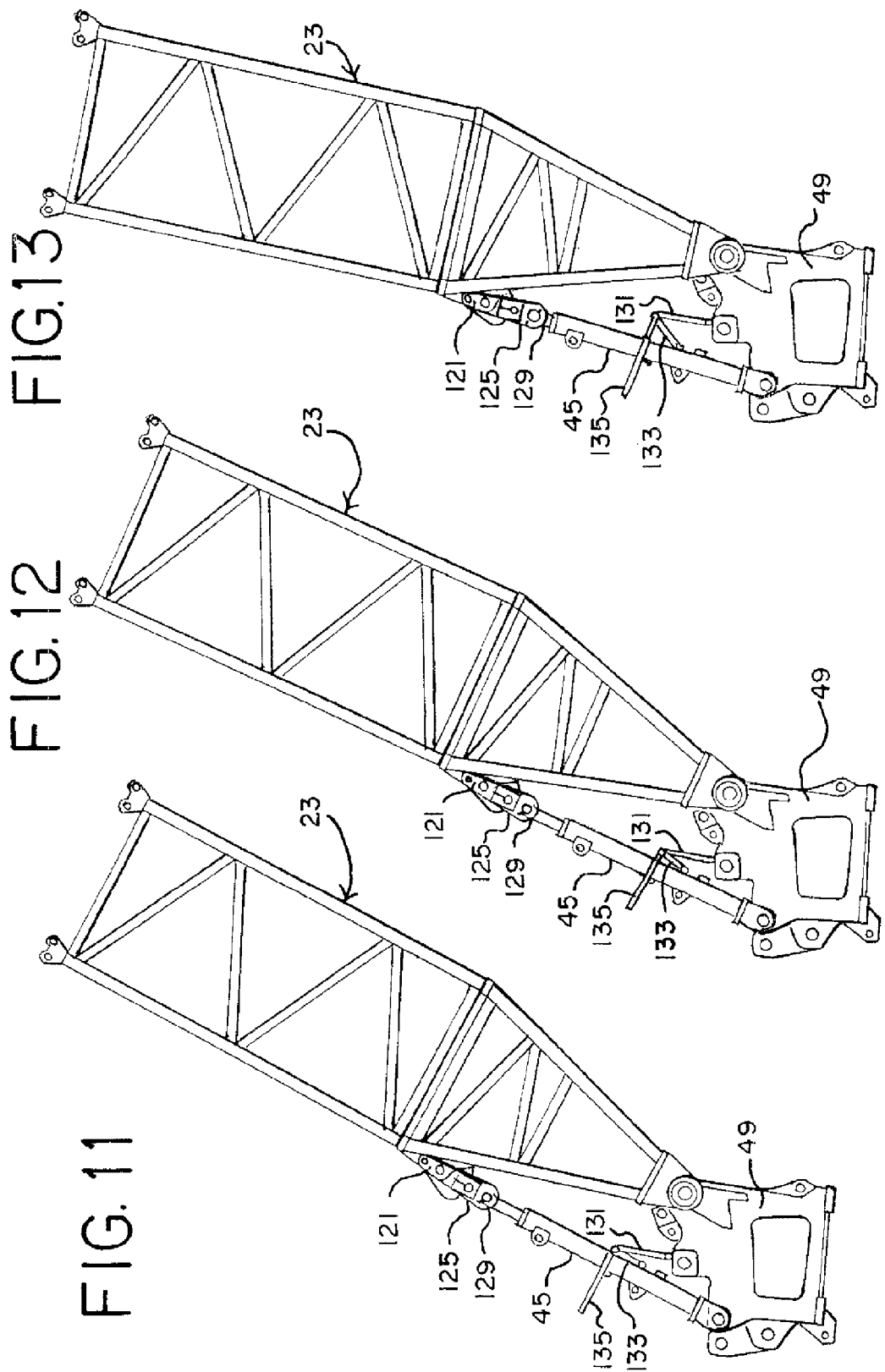

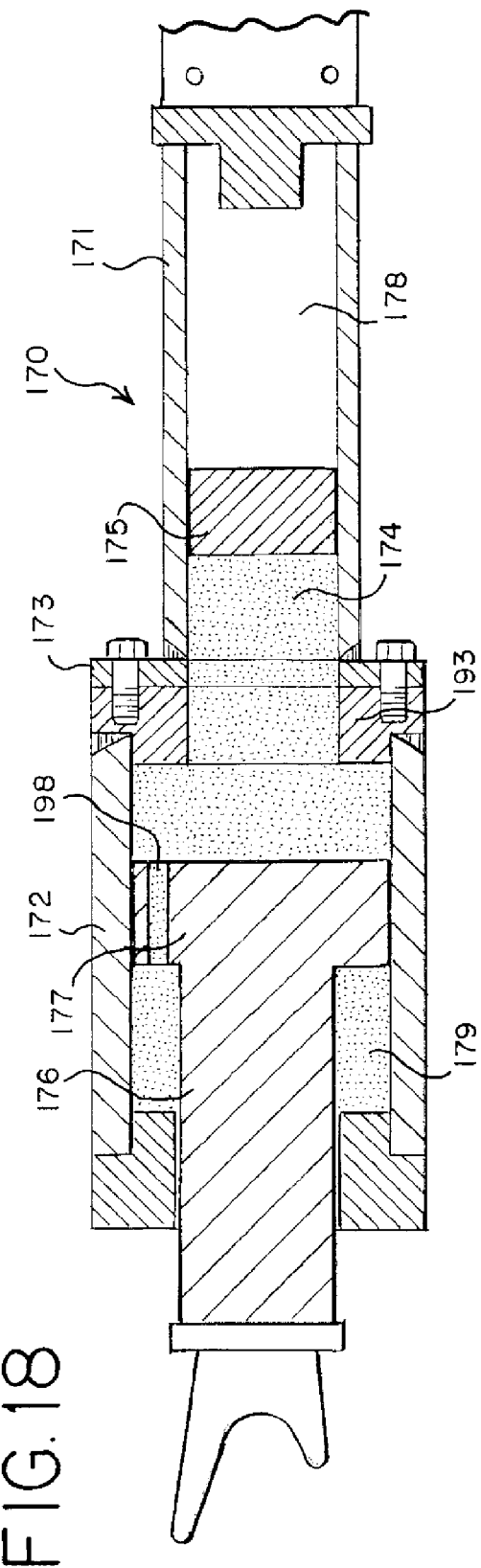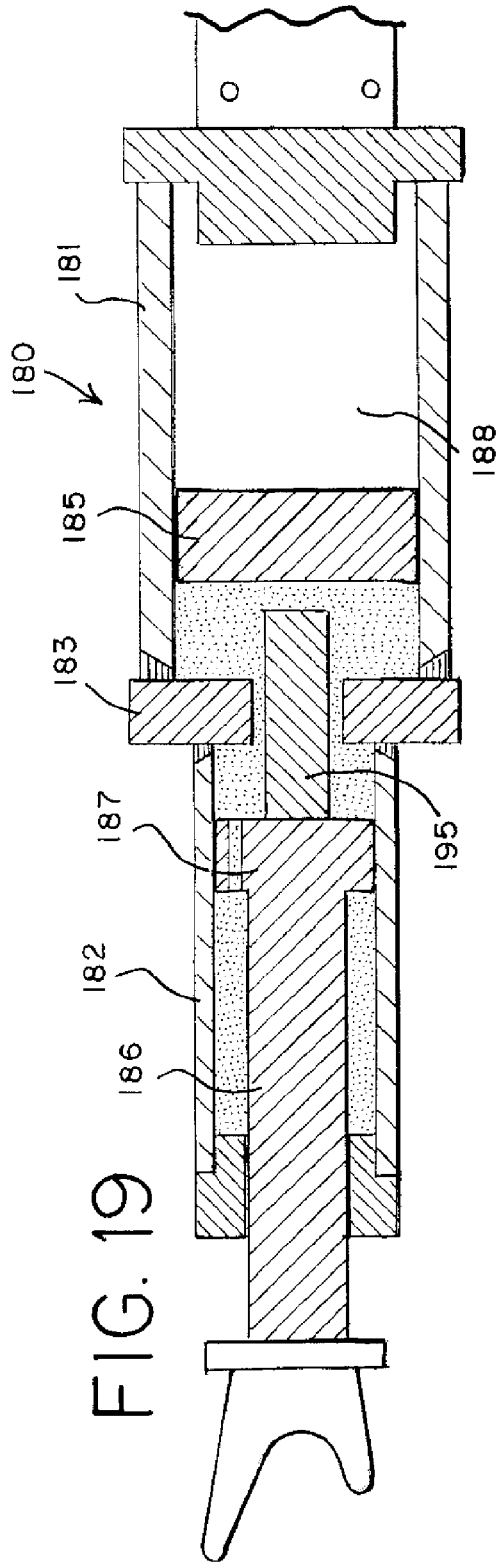

COMPRESSIBLE STOP MEMBER FOR USE ON A CRANE

REFERENCE TO EARLIER FILED APPLICATION

The present application claims the benefit of the filing date under 35 U.S.C. §119(e) of Provisional U.S. Patent Application Ser. No. 61/179,935, filed May 20, 2009; which is hereby incorporated by reference in its entirety.

BACKGROUND

The present invention relates to a compressible stop member for use on a crane, such as a boom stop used on a mobile lifting crane, and particularly a compressible stop member that includes an accumulator.

Lift cranes typically include a carbody; ground engaging members elevating the carbody off the ground; a rotating bed rotatably connected to the carbody such that the rotating bed can swing with respect to the ground engaging members; and a boom pivotally mounted on the rotating bed, with a load hoist line extending there from. For mobile lift cranes, the ground engaging members are moveable ground engaging members. There are different types of moveable ground engaging members, most notably tires for truck mounted cranes, and crawlers. Typically the mobile lift cranes include a counterweight to help balance the crane when the crane lifts a load.

A crane with a povitable boom will typically include a compressible stop member, often referred to as a boom stop, used to prevent the boom from tipping over backwards, particularly if a load is suddenly released while the boom is at a steep boom angle. Known boom stops typically included a spring so that the boom stop can start to engage the boom as it is moving to a steep boom angle but before it reaches a point where it would tip backward. The spring applies greater and greater force the further the boom stop is compressed. This compression provides a return force to push the boom back to conventional working angles when the reason it was raised so steeply has ended. A conventional boom stop might be built with a tube inside of a tube, with a spring inside of the tubes. If the boom came into contact with the boom stop and still continued to travel to where it might tip over backward, the spring would be compressed until it reached a solid height, thus greatly increasing the stopping ability of the boom stop.

While such boom stops have proven themselves to be adequate, they have a disadvantage in that the spring and tube arrangement cannot be easily scaled up in size due to physical limitations on the space available for the boom stop. For example, a larger crane that has higher capacities may not necessarily be proportionately larger in all dimensions. The larger crane will need a boom stop that can absorb more energy, but the space in which to deploy that boom stop may not be large enough that a larger spring and tube arrangement can simply be used for the boom stop. Thus there remains a need for a boom stop that can generate greater stopping force in a more compact space.

Some cranes also include a luffing jib. The luffing jib usually includes a jib stop, used to also prevent the jib from tipping over backward at high jib angles. The same issues discussed above with respect to boom stops are often applicable to jib stops. Some cranes also include a mast, and struts such as jib struts. The present invention may also be useful for compressible stop members used for these other crane columns.

BRIEF SUMMARY

A compressible stop member has been invented that allows for a compact spacing of components that can produce large stopping forces and absorb large amounts of energy needed for a boom stop or a jib stop on a high capacity crane.

In a first aspect, the invention is a compressible stop member for use on a crane comprising: a) a housing having a first sealed end, a second end and an internal surface comprising a first cylindrical surface having a first diameter and a second cylindrical surface having a second diameter; b) a free piston slidably contained within the housing in a sealing engagement with the first cylindrical surface of the housing; c) a compressed gas chamber in the housing between the free piston and the first sealed end; and d) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing. The rod support portion is slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing. Also, the rod support portion includes at least one flow channel allowing liquid to flow unimpeded between the first and second liquid chambers as the rod support portion slides within the housing.

In a specific embodiment of this first aspect, a boom stop comprises i) a housing having an internal cylindrical surface having a diameter, a first sealed end and a second end; ii) a free piston slidably contained within the housing in a sealing engagement with the internal cylindrical surface of the housing; iii) a compressed gas chamber in the housing between the free piston and the first sealed end; iv) a rod extending out of the second end of the housing with a sliding sealing engagement at the second end, terminating in a second end of the rod, the rod having a diameter less than the internal diameter of the housing; and v) a rod support portion slidably contained within the housing in a sliding engagement with the internal cylindrical surface of the housing. The rod support portion separates the volume between the free piston and the second end of the housing into first and second liquid chambers, the first liquid chamber comprising the volume inside the housing between the free piston and the rod support portion, the second liquid chamber comprising the annular space between the rod and the internal cylindrical surface of the housing. The rod support portion includes at least one flow channel allowing liquid to flow unimpeded between the first and second liquid chambers as the rod support portion slides within the housing.

In a second aspect, the invention is a lift crane lift crane comprising a carbody; ground engaging members elevating the carbody off the ground; a rotating bed rotatably connected to the carbody; a boom pivotally mounted on the rotating bed; and at least one compressible stop member, the compressible stop member comprising i) a housing having a first sealed end, a second end and an internal surface comprising a first cylindrical surface having a first diameter and a second cylindrical surface having a second diameter; ii) a free piston slidably contained within the housing in a sealing engagement with the first cylindrical surface of the housing; iii) a compressed gas chamber in the housing between the free piston and the first sealed end; and iv) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing. The rod support portion is slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing. The rod support portion includes at least one flow channel allowing liquid to flow between the first and second liquid chambers as the rod support portion slides within the housing.

In a specific embodiment of this second aspect, the lift crane comprises at least one boom stop having i) a housing having an internal cylindrical surface having a diameter, a first sealed end and a second end; ii) a free piston slidably contained within the housing in a sealing engagement with the internal cylindrical surface of the housing; iii) a compressed gas chamber in the housing between the free piston and the first sealed end; iv) a rod extending out of the second end of the housing with a sliding sealing engagement at the second end, terminating in a second end of the rod, the rod having a diameter less than the internal diameter of the housing; and v) a rod support portion slidably contained within the housing in a sliding engagement with the internal cylindrical surface of the housing. The rod support portion separates the volume between the free piston and the second end of the housing into first and second liquid chambers, the first liquid chamber comprising the volume inside the housing between the free piston and the rod support portion, the second liquid chamber comprising the annular space between the rod and the internal cylindrical surface of the housing. The rod support portion includes at least one flow channel allowing liquid to flow between the first and second liquid chambers as the rod support portion slides within the housing.

In a third aspect, the invention is a method of stopping a column member that is pivotally mounted on a lift crane from tipping over backward comprising: a) providing at least one compressible stop member comprising: i) a housing having a first sealed end, a second end and an internal surface comprising a first cylindrical surface having a first diameter and a second cylindrical surface having a second diameter; ii) a free piston slidably contained within the housing in a sealing engagement with the first cylindrical surface of the housing; iii) a compressed gas chamber in the housing between the free piston and the first sealed end; and iv) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing; v) the rod support portion being slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing; vi) wherein the rod support portion includes at least one flow channel allowing liquid to flow between the first and second liquid chambers as the rod support portion slides within the housing; and b) attaching the at least one compressible stop member to the crane with a pivotal connection and positioned so that the compressible stop member will engage the column member when the column member reaches a first angle; c) wherein movement of the column member from said first angle to a second steeper angle causes the rod to be pushed into the housing, thereby forcing the rod support portion toward the free piston, with liquid flowing from the first liquid chamber into the second liquid chamber as the rod travels, creating an increased volume in the second liquid chamber but a decreased volume in the first liquid chamber and a commensurate increase in pressure in the gas chamber and on the rod support portion, thereby impeding the movement of the column member towards the second steeper angle.

In a specific embodiment of this third aspect, the method involves stopping a boom that is pivotally mounted on a rotating bed of a lift crane from tipping over backward utilizing a boom stop having i) a housing having an internal cylindrical surface having a diameter, a first sealed end and a second end; ii) a free piston slidably contained within the housing in a sealing engagement with the internal cylindrical surface of the housing; a compressed gas chamber in the housing between the free piston and the first sealed end; iv) a rod extending out of the second end of the housing with a sliding sealing engagement at the second end, terminating in a second end of the rod, the rod having a diameter less than the internal diameter of the housing; and v) a rod support portion slidably contained within the housing in a sliding engagement with the internal cylindrical surface of the housing. The rod support portion separates the volume between the free piston and the second end of the housing into first and second liquid chambers, the first liquid chamber comprising the volume inside the housing between the free piston and the rod support portion, the second liquid chamber comprising the annular space between the rod and the internal cylindrical surface of the housing. The rod support portion includes at least one flow channel allowing liquid to flow between the first and second liquid chambers as the rod support portion slides within the housing. The at least one boom stop is attached to the rotating bed with a pivotal connection and positioned so that the boom stop will engage the boom when the boom reaches a first angle compared to the plane of rotation of the rotating bed, the rod support portion being in contact with the second end of the boom stop housing; and wherein movement of the boom from said first angle to a second steeper angle causes the rod to be pushed into the housing, thereby forcing the rod support portion toward the free piston, with liquid flowing from the first liquid chamber into the second liquid chamber as the rod travels, creating an increased volume in the second liquid chamber but a decreased volume in the first liquid chamber and a commensurate increase in pressure in the gas chamber and on the rod support portion, thereby impeding the movement of the boom towards the second steeper angle.

The preferred compressible stop member of the present invention uses an accumulator and a hydraulic cylinder, but the entire hydraulic system is all contained in the compressible stop member. There is no flow into or out of the compressible stop member, and thus no need for hydraulic connections between the compressible stop member and separate accumulator, or other parts of a hydraulic system. These and other advantages of the invention, as well as the invention itself, will be more easily understood in view of the attached drawings.

BRIEF DESCRIPTION OF THE DRAWINGS

FIG. 4 is a top plan view of the boom stop of the crane of FIG. 1 in a compressed state.

FIG. 5 is an end elevation view taken along line 5-5 of FIG. 4.

FIG. 6 is a cross-sectional view taken along line 6-6 of FIG. 4 of the boom stop in a non-compressed state.

FIG. 7 is a cross-sectional view taken along line 6-6 of FIG. 4 of the boom stop in a partially-compressed state.

FIG. 8 is a cross-sectional view taken along line 6-6 of FIG. 4 of the boom stop in a compressed state.

FIG. 9 is an enlarged cross-sectional taken along line 9-9 of FIG. 4.

FIG. 10 is an enlarged cross-sectional taken along line 10-10 of FIG. 4.

FIG. 11 is an enlarged partial side elevational view of the connection between the boom top and the luffing jib of the mobile lift of FIG. 1, showing the jib in initial contact with a jib stop.

FIG. 12 is an enlarged partial side elevational view like FIG. 11, showing the jib stop engaged and in a position where cushioning starts.

FIG. 13 is an enlarged partial side elevational view like FIG. 11, showing the jib stop engaged and in a position where a rigid stop portion of the jib stop engages, preventing any further jib elevation with respect to the boom.

FIG. 18 is a cross-sectional view of a fourth embodiment of a compressible stop member of the present invention.

FIG. 19 is a cross-sectional view of a fifth embodiment of a compressible stop member of the present invention.

DETAILED DESCRIPTION OF THE DRAWINGS AND THE PRESENTLY PREFERRED EMBODIMENTS

Figure 1:
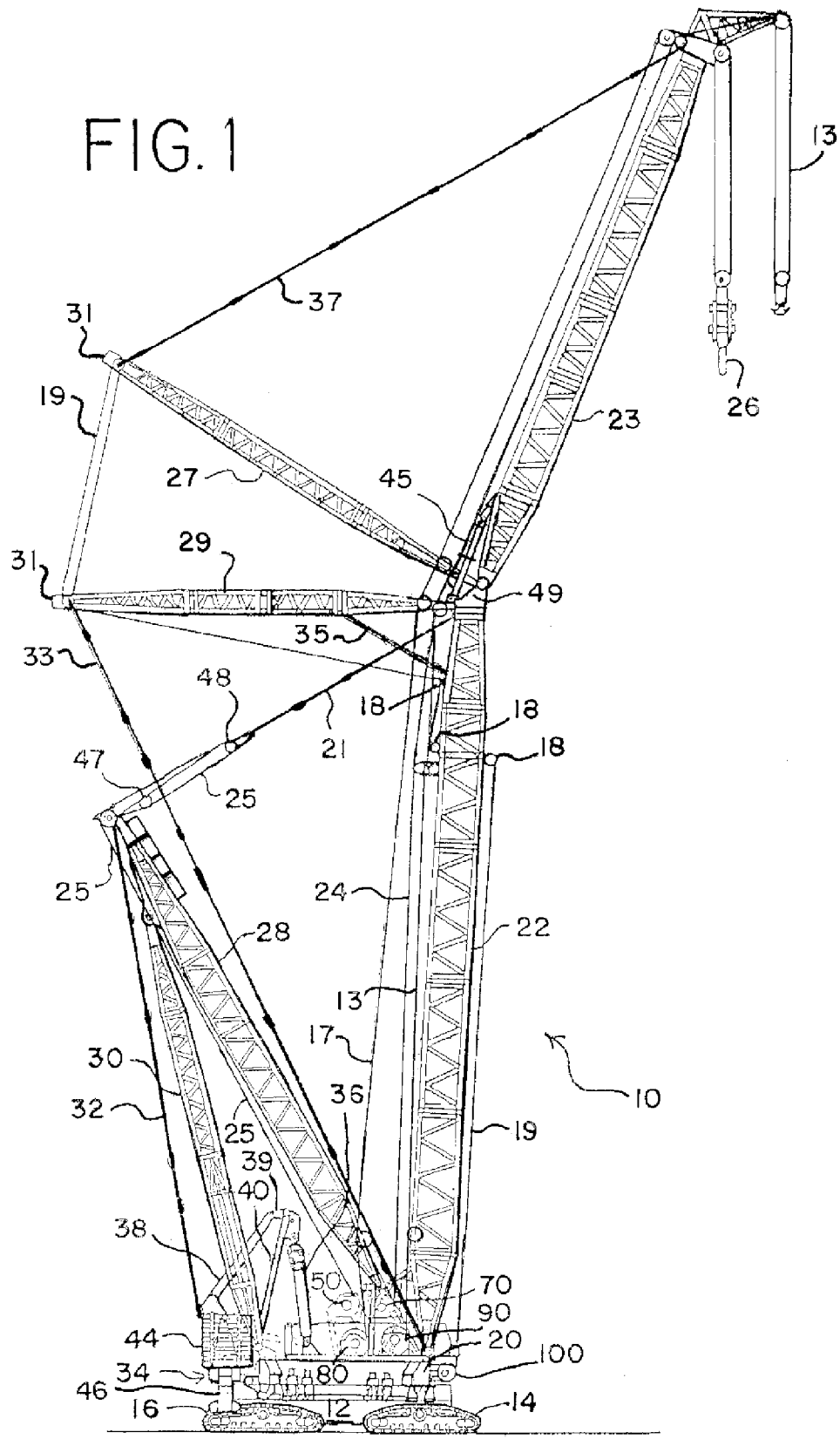
FIG. 1 is a side elevational view of a mobile lift crane using the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred embodiment of the present invention relates to a high capacity mobile lift crane, other aspects of which are disclosed in U.S. Pat. No. 7,546,928 and the following co-pending United States patent applications assigned to the assignee of the present application: "Mobile Lift Crane With Variable Position Counterweight," Ser. No. 12/023,902, filed Jan. 31, 2008; "Mast Raising Structure And Process For High-Capacity Mobile Lift Crane," Ser. No. 11/740,726, filed Apr. 26, 2007; "Connection System For Crane Boom Segments," Ser. No. 12/273,310, filed Nov. 18, 2008; "Drive Tumbler And Track Drive For Mobile Vehicles, Including Lift Cranes," Ser. No. 12/368,143, filed Feb. 9, 2009; "Track Connection System For Mobile Vehicles, Including Lift Cranes," Ser. No. 12/368,125, filed Feb. 9, 2009;"Track Tensioning System For Mobile Vehicles, Including Lift Cranes," Ser. No. 12/368,113, filed Feb. 9, 2009; "Boom Hoist Transportation System And Crane Using Same," Ser. No. 12/561,007, filed Sep. 16, 2009; Carbody Connection System And Crane Using Same," Ser. No. 12/561,103, filed Sep. 16, 2009; "Trunnion Transportation System And Crane Using Same," Ser. No. 12/561,058, filed Sep. 16, 2009; "Drum Frame System For Cranes," Ser. No. 12/561,094, filed Sep. 16, 2009; Swing Drive System For Cranes," Ser. No. 12/710,960, filed Feb. 23, 2010; "Crane Hook Block," Ser. No. 12/709,678, filed Feb. 22, 2010; "Counterweight Block And Assemblies For Cranes," Ser. No. 12/718,156, filed Mar. 5, 2010; "Folding Jib Main Strut And Transportable Reeved Strut Caps," Ser. No. 12/730,421, filed Mar. 24, 2010; and "Crane Backstay Spreader," Ser. No. 12/777,094, filed May 10, 2010. Each of these applications is hereby incorporated by reference.

Several terms used in the specification and claims have a meaning defined as follows.

In preferred embodiments of the invention, liquid is allowed to flow unimpeded within the compressible stop member. The term "unimpeded" means that no restriction, such as an orifice, is placed in the flow path that would cause a pressure drop in the liquid as it flows through the flow path. Any fluid will inherently have a pressure drop as it flows through any passageway, but the term "unimpeded" means that the pressure drop is negligible for the intended flow of the liquid in the hydraulic system.

The compressible stop member includes a rod in a housing. The term "rod" means the portion of the compressible stop member that extends from outside the housing into the housing, and all elements that move therewith. The rod includes a cylindrical portion that extends through the end of the housing. The rod also includes a rod support portion that is slidably contained within the housing. The rod support portion may constitute the first end the rod. However, a portion of the rod may extend further into the housing than the rod support portion. All of these portions of the rod may be formed as one monolithic unit, or the rod may be made from several parts that are fastened together. All of the parts that move together are considered to be parts of the "rod".

The preferred compressible stop member is designed for use in preventing a boom or jib on a crane from tipping over backward when they are at a steep angle. Both the boom and the jib are generically "column members" on the crane. Of course the compressible stop member could be used to prevent or limit movement of other column members on a crane, such as a mast or struts.

While the invention will have applicability to many types of cranes, it will be described in connection with mobile lift crane 10, shown in an operational configuration in FIG. 1. The mobile lift crane 10 includes lower works, also referred to as a carbody 12, and moveable ground engaging members in the form of crawlers 14 and 16. There are of course two front crawlers 14 and two rear crawlers 16, only one each of which can be seen from the side views of FIGS. 1 and 2. In the crane 10, the ground engaging members could be just one set of crawlers, one crawler on each side. Of course additional crawlers than those shown can be used, as well-as other types of ground engaging members, such as tires.

A rotating bed 20 is mounted to the carbody 12 with a slewing ring, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed, with a lower equalizer 47 connected to the mast adjacent the second end of the mast; a backhitch 30 connected between the mast and a rear portion of the rotating bed; and a moveable counterweight unit 34. The counterweight may be in the form of multiple stacks of individual counterweight members 44 on a support member.

Boom hoist rigging (described in more detail below) between the top of mast 28 and boom 22 is used to control the boom angle and transfer load so that the counterweight can be used to balance a load lifted by the crane. A load hoist line 24 is trained over a pulley (usually multiple sheaves in a sheave set) on the boom 22, supporting a hook 26. At the other end, the load hoist line is wound on a first main load hoist drum 70 connected to the rotating bed, described in more detail below. The rotating bed 20 includes other elements commonly found on a mobile lift crane, such as an operator's cab, hoist drum 50 for the boom hoist rigging, a second main hoist drum 80 and an auxiliary load hoist drum 90 for a whip line, also described in more detail below. If desired, and as shown in FIG. 1, the boom 22 may comprise a luffing jib 23 pivotally mounted to the top of the main boom, or other boom configurations. When a luffing jib 23 is included, the crane may include a compressible stop member in the form of jib stop 45, as well as first and second jib struts and associated luffing jib rigging and a luffing jib hoist drum 100. Luffing jib hoist line 19 runs from drum 100 through wire rope guides 18, and up to the rigging between sheaves in strut caps 31, and is used to control the angle between jib strut 27 and main strut 29. Jib backstay straps 33 run between the main strut 29 and the bottom of the boom 22, creating a fixed angle between the boom 22 and the main strut 29. Likewise jib support straps 37 connect the end of the luffing jib 23 and the jib strut 27, creating a fixed angle between those two members. Thus, the angle between the main strut 29 and jib strut 27 also defines the angle that the luffing jib 23 makes with the main boom 22. A strut stop 35 is connected between the main strut 29 and the boom 22 to provide support to the main strut 29 if no load is on the jib 23 and the forces pulling the main strut up are less than the forces pulling the main strut down. Details of how the struts, jib hoist rigging and jib backstay straps 33 are assembled are more fully disclosed in U.S. patent application Ser. No. 12/730,421. The connection of jib strut 27 between the boom top and the jib 23 is shown in FIGS. 11-13, described more fully below. While not discussed further herein, the strut stop 35 could be configured like the compressible stop member used for the boom stop 15 and jib stop 45 described in detail below.

The backhitch 30 is connected adjacent the top of the mast 28, but down the mast far enough that it does not interfere with other items connected to the mast. The backhitch 30 may comprise a lattice member, as shown in FIG. 1, designed to carry both compression and tension loads. In the crane 10, the mast is held at a fixed angle with respect to the rotating bed during crane operations, such as a pick, move and set operation.

The counterweight unit 34 is moveable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast, described more fully in U.S. patent application Ser. No. 12/023,902.

At least one linear actuation device 36, such as a hydraulic cylinder, or alternatively a rack and pinion assembly, and at least one arm pivotally connected at a first end to the rotating bed and at a second end to the a linear actuation device 36, are used in the counterweight movement structure of crane 10 to change the position of the counterweight. The arm and linear actuation device 36 are connected between the rotating bed and the counterweight unit such that extension and retraction of the linear actuation device 36 changes the position of the counterweight unit compared to the rotating bed. While FIG. 1 shows the counterweight unit in its most forward position, the linear actuation device 36 can be partially or fully extended, which moves the counterweight unit to mid and aft positions, or any intermediate position, such as when a load is suspended from the hook 26.

Figure 2:
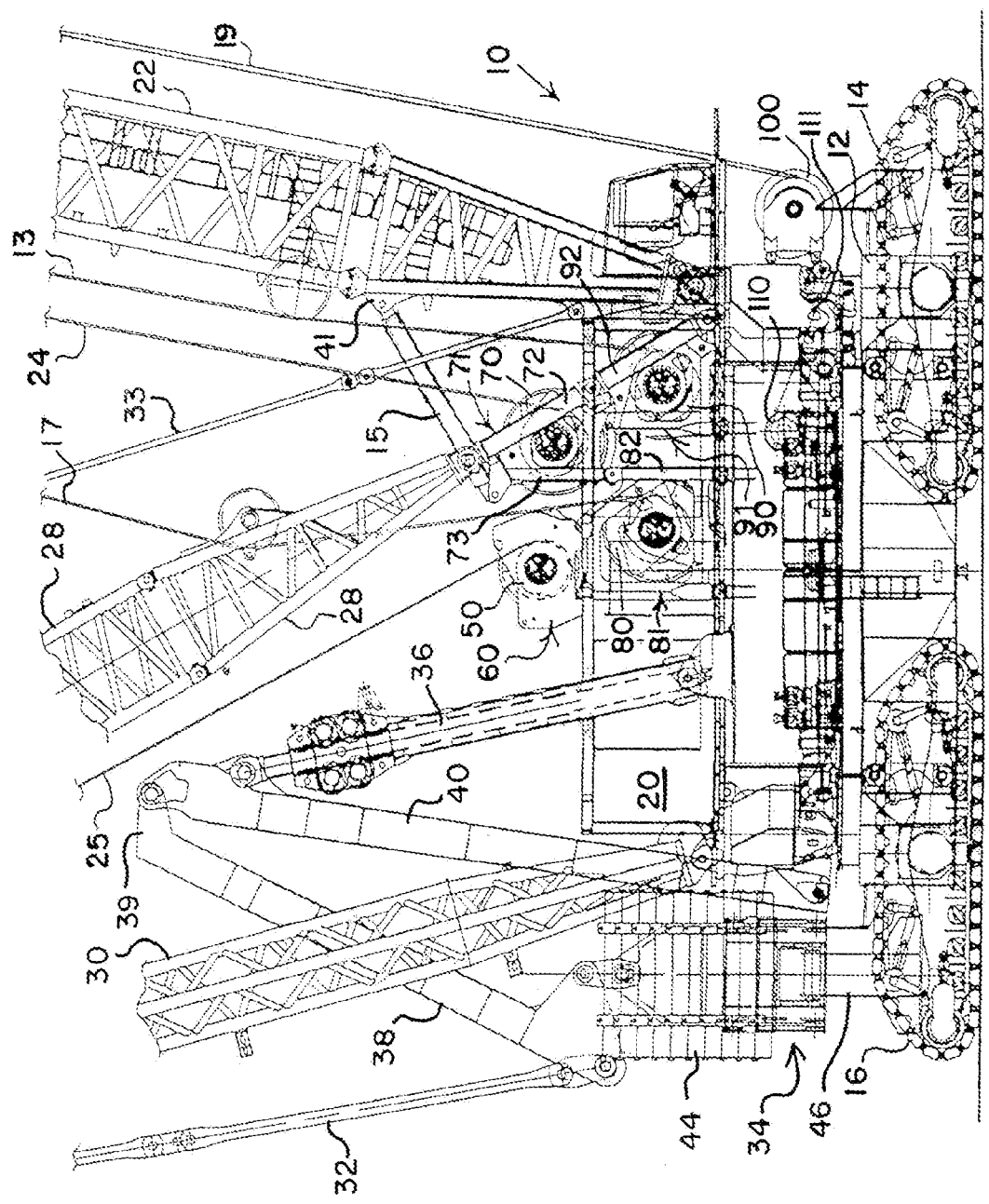
FIG. 2 is an enlarged partial side elevational view of the mobile lift of FIG. 1.

In the preferred embodiment of the counterweight movement structure, a pivot frame 40, which may be a solid welded plate structure as shown in FIG. 2, is connected between the rotating bed 20 and the second end of the linear actuation device 36. The rear arm 38 is connected between the pivot frame 40 and the counterweight unit. The rear arm 38 is also a welded plate structure with an angled portion 39 at the end that connects to the pivot frame 40. This allows the arm 38 to connect directly in line with the pivot frame 40. The backhitch 30 has an A-shape configuration, with spread apart lower legs, which allows the counterweight movement structure to pass between the legs when needed.

The crane 10 may be equipped with a counterweight support system 46, which may be required to comply with crane regulations in some countries. The counterweight movement structure and counterweight support structure are more fully disclosed in U.S. patent application Ser. No. 12/023,902.

The boom hoist rigging includes a boom hoist line in the form of wire rope 25 wound on a boom hoist drum 50, and reeved through sheaves on a lower equalizer 47 and an upper equalizer 48. The boom hoist drum is mounted in a frame 60 (FIG. 2) connected to the rotating bed. The rigging also includes fixed length pendants 21 connected between the boom top and the upper equalizer 48. The lower equalizer 47 is connected to the rotating bed 20 though the mast 28. This arrangement allows rotation of the boom hoist drum 50 to change the amount of boom hoist line 25 between the lower equalizer 47 and the upper equalizer 48, thereby changing the angle between the rotating bed 20 and the boom 22.

The boom hoist drum frame 60, the lower equalizer 47 and the upper equalizer 48 each include cooperating attachment structures whereby the lower and upper equalizers can be detachably connected to the boom hoist drum frame so that the boom hoist drum, the lower equalizer, the upper equalizer and the boom hoist line can be transported as a combined assembly. The combined boom hoist drum 50, frame 60, lower equalizer 47 and upper equalizer 48, arranged as they would be for transportation between job sites, are described in U.S. patent application Ser. No. 12/561,007.

Crane 10 includes four drums each mounted in a frame and connected to the rotating bed in a stacked configuration. (The rotating bed includes a main frame and front and rear roller carriers.) In addition, the jib hoist drum 100 is mounted in a frame attached to the front surface of the front roller carrier. Frames of two of the four stacked drums are connected directly to the rotating bed, while the frames of the other two drums are indirectly connected to the rotating bed by being directly connected to at least one of the two drum frames connected directly to the rotating bed. In this case, the four stacked drums are preferably the first main load hoist drum 70 with load hoist line 24 wound thereon, the second main load hoist drum 80 with load hoist line 17 wound thereon, the auxiliary load hoist drum 90 with whip line 13 wound thereon, and the boom hoist drum 50 with boom hoist line 25 wound thereon. Preferably, the frame 91 of the auxiliary load hoist drum 90 and frame 81 of the second main load hoist drum 80 are connected directly to the rotating bed (the frame 91 pins at its front onto the front roller carrier), the frame 71 of the first main load hoist drum 70 is connected to both of frames 81 and 91, while the frame 60 for the boom hoist drum 50 is connected to frame 81. In that regard, the boom hoist drum frame 60 is thus stacked on top of and pinned directly to the second main load hoist drum frame 81, and the first main load hoist drum frame 71 is stacked on top of and pinned directly to the auxiliary load hoist drum frame 91. The drum frames are connected to the rotating bed and to each other by removable pins, allowing the frames to be disconnected from and transported separately from the rotating bed.

A sixth drum includes a rigging winch drum 110 on which is wound a rigging winch line 111. The rigging winch drum 110 is attached to a lower section of the rotating bed 20 and is lighter weight than the other drums. The rigging winch line 111, in one embodiment, may be a 19 mm winch line that is generally used to help assemble the crane 10, such as being used to help to speed reeving the sheaves of the strut caps 31, and assembly of the main strut 29, as discussed in U.S. patent application Ser. No. 12/730,421.

In addition to the load hoist and boom hoist drums being mounted in frames connected to the rotating bed by removable pins so that they can each be detached from the rotating bed as a combined drum and frame unit, as shown in FIG. 2, the stack of drum frames allows for placement of the mast 28 and a compressible stop member in the form of boom stop 15 to be connected indirectly to the rotating bed such that forces directed along a line of action of the mast 28 and the boom stop 15 are transferred to the rotating bed through at least one of the drum frames. The mast 28 carries compressive loads. Thus the line of action of the forces in the mast is directed down the axis of the mast. The connection point of the mast to the drum frame system directs those forces though the drum frame system to the rotating bed 20. In the embodiment shown in FIG. 2 it is easy to see how the compressive load of the mast is carried through the front diagonal legs 72 and 92 of drum frames 71 and 91. The legs 72 and 92 are in a direct line with the axis of the mast.

The boom stop 15 has a line of action through the longitudinal axis of the boom stop. The forces in the boom stop are thus transferred from the boom stop into a pin at the top of leg 73 that is in line with the longitudinal axis of the boom stop. The forces at the pin are then transferred to the rotating bed through the geometry of the members of drum frames 71, 81 and 91. If the boom 22 were to recoil backward beyond its maximum designed nearly-vertical position, compressive loads would be transmitted through the boom stop 15 to the pin at the top of leg 73 into the structure of frame 71. That load would be resolved by a compressive force down the legs 73 of frame 71 and legs 82 of frame 81, and a tension load through the legs 72 of frame 71 and legs 92 of frame 91. Thus with the boom stop 15, the forces directed along a line of action of the boom stop are transferred to the rotating bed 20 through three of the drum frames.

While one boom stop 15 has been discussed above, preferably the crane 10 includes two boom stops 15. However, the boom stops 15 are nearly identical, and placed on the rotating bed 20 such that only one of them can be seen from the side views of FIGS. 1 and 2. As noted above, and as best seen in FIG. 3, the boom stop 15 is supported on one end by being pinned to the top of leg 73 of hoist drum frame 71. A bumper 75 mounted on the hoist drum frame provides the boom stop 15 with a rest when not engaged with the boom. The boom 22 includes a boom stop engagement member 41 and the boom stop 15 includes a U-shaped member 79 shaped and sized to engage the boom stop engagement member 41. Preferably the boom engagement member for each boom stop 15 includes a pin 42 captured between plates welded to the boom 22.

As best seen in FIGS. 4-10, the boom stop 15 is made up of several members: a housing 52, a free piston 62, and a rod 76 that includes rod support portion 64. The housing 52 has an internal cylindrical surface 53, a first sealed end 54 and a second end 56. The free piston 62 is slidably contained within the housing 52 in a sealing engagement with the internal cylindrical surface 53 of the housing. A compressed gas chamber 58 is located in the housing between the free piston 62 and the first sealed end 54. (The size of the compressed gas chamber 58 varies as different amounts of force are applied to the rod, as explained below.) Functionally, the internal cylindrical surface 53 provides three cylindrical surfaces, a first surface for sliding engagement with the free piston, a second surface defining a liquid chamber around the cylindrical portion of rod 76 (discussed further below), and a third surface for sliding engagement with the rod support portion 64. Since in this embodiment all three surfaces are the same diameter and formed as part of a single cylindrical bore in housing 52, the internal surface 53 is specified generally. Lifting lugs 51 are provided on the outside of the housing 52, along with stabilizing ears 61 with holes through them that are used to pin the boom stop 15 during transport.

The rod support portion 64 is also slidably contained within the housing 52 in a sliding engagement with the internal cylindrical surface 53 of the housing. The rod support portion 64 separates the volume between the free piston 62 and the second end 56 of the housing 52 into first and second liquid chambers 57 and 59, the first liquid chamber 57 comprising the volume inside the housing between the free piston 62 and the rod support portion 64. The rod support portion 64 includes at least one, and preferably at least two, flow channels 65. Preferably these flow channels are unimpeded, allowing liquid to flow between the first liquid chamber 57 and the second liquid chamber 59 with negligible pressure drop as the rod support portion 64 slides within the housing 52.

The rod 76 is fixed at a first end 77 to the rod support portion 64 and extends out of the second end 56 of the housing with a sliding sealing engagement at the second end, terminating in a second end 78 of the rod. The rod 76 has a diameter less than the internal diameter of the housing 52. The second liquid chamber 59 thus comprises the annular space between the rod 76 and the internal cylindrical surface 53 of the housing 52, bounded by the rod support portion 64 and the second end 56 of the housing 52.

In the preferred embodiment shown, the boom stop 15 includes structures to attach the boom stop to the hoist drum frame 71 (and thus to the rotating bed 20) on one end, and to engage the boom 22 on the other end. In the embodiment depicted, the sealed end 54 of the housing 52 is configured for pivotal attachment to a crane rotating bed, and the second end 78 of the rod 76 comprises a column member engagement surface, in this case a boom engagement surface. Of course the boom stop 15 could be mounted in a reverse configuration, so that the rod 76 was attached to the frame 71 and rotating bed 20, and the sealed end of the housing was configured to engage the boom 22.

Figure 3:
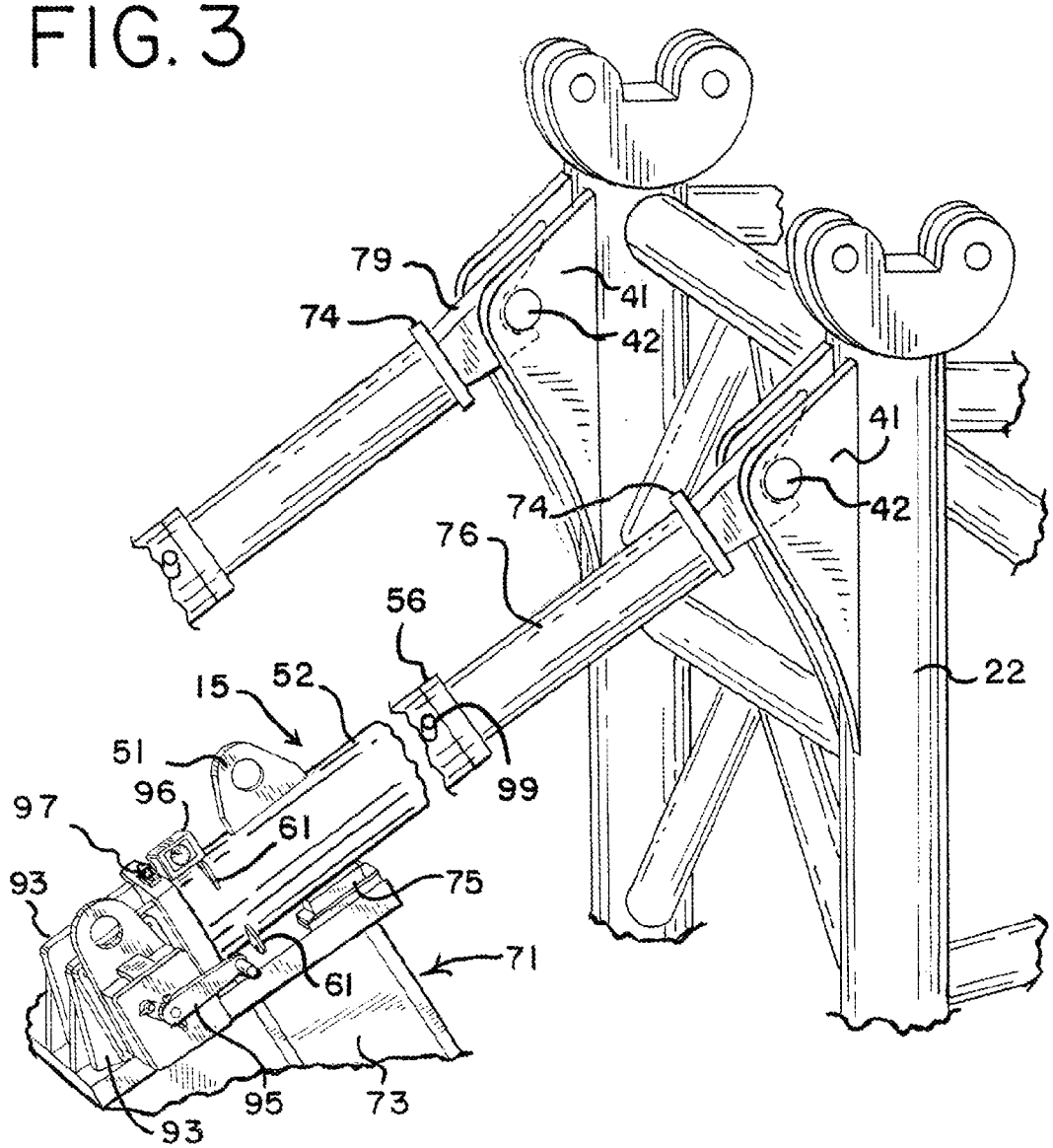
FIG. 3 is a perspective view of the mounting for the boom stop used on the crane of FIG. 1.

Preferably the sealed end of the housing includes at least one, and preferably two, extensions 93, each of which includes a pin hole 94 (FIG. 8) therethrough. As discussed above, the pin allows the housing 52 to be pivotally connected to a crane rotating bed by pinning through holes 94 and holes in the top of the frame 71. Preferably a threaded member attached to the pin is provided with a handle 95 (FIG. 3). Rotation of the handle 95 allows the pin to be put into and pulled out of position so that the boom stop 15 can be connected to or released from the frame 71 and hence the rotating bed 20.

The second end 78 of the rod 76 comprises a U-shaped member 79. The U-shaped member is formed with a longer member on the top than on the bottom, reflecting the fact that the boom 22 will engage the boom stop 15 as the boom pivots upwardly from a low boom angle to the position shown in FIG. 2. The second end 78 of the rod 76 comprises a shoulder 74 larger than the internal diameter of the housing 52. This shoulder 74 is used to transmit force from the U-shaped member 79 and second end 78 of the rod directly to the housing 52 when the boom stop 15 is fully compressed.

The sealed end 54 of the housing 52 preferably includes a high pressure relief device 97, such as a safety relief valve set at a pressure higher than the maximum expected pressure in the system, but lower than the bursting pressure of the housing 52; and a port in fluid communication with a pressure gauge 96. The high pressure relief device 97 includes a port that can be opened to introduce gas into the chamber to initially fill the chamber, and to add gas if the chamber should ever need to be recharged. Filling and bleeding ports 99 are provided in the housing 52 near the second end 56 of the housing for adding liquid to the chambers 57 and 59.

As best seen in FIG. 9, the free piston 62 preferably includes a seal, such as an O-ring 83, and two guides 84, around the circumference of the free piston 62. The rod support portion 64 also preferably includes a guide 86 around its circumference. The rod support portion is attached to the remainder of the rod at first end 77 by two screws 87. As best seen in FIG. 10, the second end 56 of the housing is preferably made from a separate head piece 43 that fits into the remainder of the housing with an O-ring 87 and back-up 88 on its outer circumference, and a rod wiper 66, rod seal 67, a buffer seal 68 and a piston guide 69 on its internal surface. Port 89 is used to detect if any fluid is leaking from the liquid end of the device. A transparent container (not shown) may be connected to the port 89 to collect any fluid that is leaking past seals 67 and 68. In this manner the crane user may monitor the transparent container. If fluid is detected, then appropriate repair action must be taken. This is better way of detecting leakage than by just looking at the extended rod.

Before the boom stop 15 is installed on the crane it will be charged with hydraulic fluid and gas and then sealed. The gas (preferably nitrogen) will be charged to the gas chamber 58. The hydraulic fluid will be charged to the first and second liquid chambers 57 and 59. The pressure of the gas will force the free piston 62 to the right as seen in FIG. 6. The gas pressure acting against the free piston 62 will pressurize the liquid in first liquid chamber 57, and force the rod 76 to the right, as shown in FIG. 6. The amount of hydraulic fluid in the system will dictate the farthest right position of the free piston 62. This is because when the gas pressure pushes against the free piston, the free piston in turn generates pressure in the liquid, which acts against the left face of the rod support portion 64 and first end 77 of rod 76. If no force acts against the second end 78 of the rod 76, the rod will move to the right because the force from the left on the rod support portion 64 and first end 77 is greater than the force acting on the smaller surface area in contact with the liquid on the right face of the rod support portion 64. Fluid in the second chamber 59 will flow through channels 65 to the first liquid chamber 57 until the interference of the rod support portion 64 with the head piece 43 of the housing 52 stops the rod 76 from being forced completely out of the housing. When the rod support portion 64 is as far to the right as possible, the free piston 62 will stabilize.

When the boom 22 is at low angles, the rod 76 will extend out of the housing 52, and the boom stop 15 will rest on the bumper 75 to hold the boom stop 15 in the correct position so that the U-shaped member 79 will engage the boom stop engagement member 41 as the boom angle steepens. At a first boom angle compared to the plane of rotation of the rotating bed, the boom stop 15 will engage the boom. As noted earlier, at this first angle, the rod support portion 64 is in contact with the head piece 43 making up the second end 56 of the boom stop housing 52. As the boom 22 continues backwards, the boom pushes on the U-shaped member 79, forcing rod 76 into housing 52. As this happens, hydraulic fluid passes from chamber 57 into chamber 59 though passageways 65. However, since each unit of length of chamber 59 has less volume than a unit of length of chamber 57, due to the presence of the rod on the right side of rod support portion 64, the liquid forces the free piston 62 to the left, thus accommodating the need for volume in the housing being taken up by the incoming rod 76. Compression of the gas in chamber 58 increases the pressure of the gas. This increased pressure is transferred to the liquid, and then acts against the first end 77 of rod 76. Thus the amount of force that it takes to compress the boom stop increases the further the rod is pushed into the housing 52. The rate of that increase is initially a function of the ratio of the diameter of the rod to the diameter of the inside surface 53 of the housing 52. Thus, movement of the boom 22 from the first angle to a second steeper angle causes the rod 76 to be pushed into the housing 52, thereby forcing the rod support portion 64 toward the free piston 62, with liquid flowing from the first liquid chamber 57 into the second liquid chamber 59 as the rod travels, creating an increased volume in the second liquid chamber but a decreased volume in the first liquid chamber and a commensurate increase in pressure in the gas chamber 58 and on the rod support portion 64, thereby impeding the movement of the boom towards the second steeper angle.

When the boom reaches the second angle, all fluid in the first chamber 57 will be in the second chamber 59, as seen in FIG. 7. Further compression of the boom stop at this point requires the rod support portion 64 to push directly against the free piston 62, and compress the gas in chamber 58, while at the same time drawing a vacuum in the liquid chambers 57 and 59. The additional force required to do this is directly proportional to the inside diameter of the housing 52. As the boom angle steepens, the boom reaches a third angle where the shoulder 74 on the second end 78 of the rod 76 comes into contact, with the head piece 43 forming the second end 56 of the housing 52, as seen in FIG. 8, and the boom stop is able to prevent any further increase in the boom angle. At this third boom angle, the boom stop cannot be compressed any further. The structure of the housing 52 thus prevents the boom 22 from tipping over any further backward. If the boom is recoiling back into this position from a sudden loss of load, the housing 52 of the boom stop must be sufficiently strong to "fail the boom", meaning that the boom 22 will start to bend, but not be able to continue pivoting backward.

When the boom moves between the first and second angles, the boom first forces the rod 76 into the housing 52 causing an increase of force on the rod proportional to the diameter of the rod, until the rod support portion 64 is adjacent to the free piston 62; and then further movement of the boom 22 causes the rod 76 to push both the rod support portion 64 and free piston 62 toward the sealed end 54 of the housing, causing an increase of force on the rod proportional to the internal diameter of the housing. During the first part of the stroke from a fully extended position to a point where the rod support portion contacts the free piston, the force is a function of the rod diameter. During the remainder of the stroke, the force is a function of the free piston diameter, which is the same as the internal diameter of the housing. The two diameters being different produce a distinct force increase at the point in the stroke where the rod support portion and free piston contact.

Of course there could be some embodiments where the point of contact between the free piston 62 and the rod support portion 64 is designed to be very near or at the same point that the shoulder 74 comes into contact with the housing 52. This prevents the need to have seals that can withstand the drawing of a vacuum in the liquid chambers 57 and 59. However, it means that up until the shoulder 74 contacts the second end 56 of the housing, only one force-compression relationship is provided.

In one embodiment, the first angle, where the boom 22 first engages with the boom stop 15, will be between about 75° and about 80°, and preferably about 78°, and the third angle, where the shoulder 74 of the rod 76 contacts the second end 56 of the housing 52, will be between about 88° and about 90°, and preferably about 88°.

In an exemplary embodiment of a compressible stop member, the rod 76 has a diameter of 8.25 inches, the cylinder bore diameter is 9.00 inches and the rod support portion includes four channels, each made from a 0.781 inch diameter hole, for fluid passage through rod support portion 64. For comparison, with that size of rod and cylinder bore diameter, a single passageway with a 0.125 inch diameter would still provide a 3 inch/second travel speed of the rod. Thus clearly the number and size of the holes in the exemplary embodiment provide unimpeded flow between liquid chamber 57 and 59. The gas pressure in chamber 58 may be precharged to 1340 psi, depending on the weights of the boom and the jib. The guides 84 and 86 may be made of Teflon.

With the preferred embodiment of the invention, the hydraulic cylinder portion of the compressible stop member and an accumulator are combined into a single compressible stop member housing. This eliminates any piping connections between the two units, reducing cost. Further, there is no valving built into the combined accumulator/hydraulic cylinder. The only liquid flow is through unimpeded channels. This makes the compressible stop member simpler and less expensive to construct. Also, the configuration of the rod and the configuration of the housing are such that, after the rod is forced into the housing to a first position, the rod and the free piston, may make direct physical contact with one another such that further movement of the rod a distance past the first position into the housing will directly force the free piston to move the same distance.

Also, the preferred embodiment may be used to provide a two stage force effect, or a single stage effect. As it turns out, the same mechanical structure is used for both the two-stage and single-stage effect compressible stop member. The amount of liquid added to the liquid chambers 57 and 59 can be adjusted to determine whether the free piston 62 and rod support portion 64 will contact each other at some intermediate position, such as shown in FIG. 7, or will not come into contact until the shoulder 74 contacts the second end 56 of the housing. This feature allows the manufacturer to design and assemble the crane, and then later decide whether the compressible stop member should provide a single stage force-compression curve, or rely on a two function curve where the second stage of compression generates greater force simply by compression of a gas in the gas chamber.

If the gas added to chamber 58 is done without completely evacuating chamber 58, there could be residual moisture inside the chamber 58. In that case it may be preferable to chrome plate the internal surface of the housing 52.

FIG. 1 shows the crane 10 equipped with a jib stop 45. The jib stop 45 can have the same internal structure as the boom stop 15. Of course the dimensions of the various parts of the compressible stop member are designed for intended loads that may be encountered by the compressible stop member. Since these intended loads will be different for the boom stop 15 and the jib stop 45, the dimensions of the various parts may be different. Also, different models of cranes, and even different boom configurations for the same crane, will have different intended loads applied to the boom stop and jib stop. However, the same basic design can be used, and to some extent the exact same housing, free piston and rod can be used with different amounts of compressible gas and hydraulic oil being placed in the compressible stop member.

FIGS. 11-15 show the jib stop 45 attached to the boom top 49 at the top of boom 22, and to the luffing jib 23. (As with boom stop 15, there is actually a pair of jib stops 45, but only one of them can be seen in the side view of FIG. 11.) The jib 23 has a jib butt with lugs 121 to which a beam 125 is attached.

The beam 125 can be wider or narrower than the jib butt, depending on where the jib stops are placed on the boom top. The beam 125 includes a jib stop engagement member, similar to boom stop engagement member 41. (The lugs 121 and beam 125 could alternatively all be constructed as one weldment, so that the jib stop engagement member was integral to the jib.) The rod in the jib stop 45 terminates with a U-shaped member 129 shaped and sized to engage the jib stop engagement member of beam 125. A positioning cylinder 131 and link 133 are used to hold the jib stop 45 at the correct position until the jib 23 engages the jib stop 45.

FIG. 11 shows the luffing jib 23 in a position of initial contact with the jib stop 45. In this position, the positioning cylinder 131 is completely retracted. The positioning cylinder 131 has an adjustable rod end that can be used to obtain a desired set up clearance dimension where the position cylinder is fully retracted, the U-Shaped member 129 has one side that contacts the pin spanning between the brackets making up the jib stop engagement member on beam 125, but the pin is not yet seated in the bottom of the U-shaped member 129.

FIG. 12 shows the jib stop 45 engaged with the jib 23 and the start of a cushioning action. In the embodiment shown, this may start when the jib is at an angle of about 20° compared to the axis of the boom. The positioning cylinder 131 is still fully retracted. FIG. 13 shows the jib 23 being brought to an angle of about 7° compared to the boom axis. In this position the jib stop 45 reaches a rigid stop, just like when the shoulder 74 hits the housing end 56 in the boom stop 15. Thus the jib stop 45 provides cushioning stop over a range of about 13°. The positioning cylinder 131 is still fully retracted. A pair of spring loaded struts 135 (only one of which can be seen in the side view of FIGS. 11-15) are attached with a collar around the jib stop 45 and connected to the positioning cylinder 131 to prevent unwanted pivoting of the jib stop 45, assuring contact between the jib stop engagement member 125 and jib stop 45. The struts 135 are used to keep the link 133 attached to the positioning cylinder 131 against the jib stop 45. This insures the correct position when the jib 23 is not engaged with the jib stop 45. The springs in struts 135 allow the jib stop 45 to rotate away from the link 133 and positioning cylinder 131 when the jib 23 is engaged with the jib stop 45. The springs are preloaded to maintain the stop position with a desired amount of machine dynamics.

Figure 14:
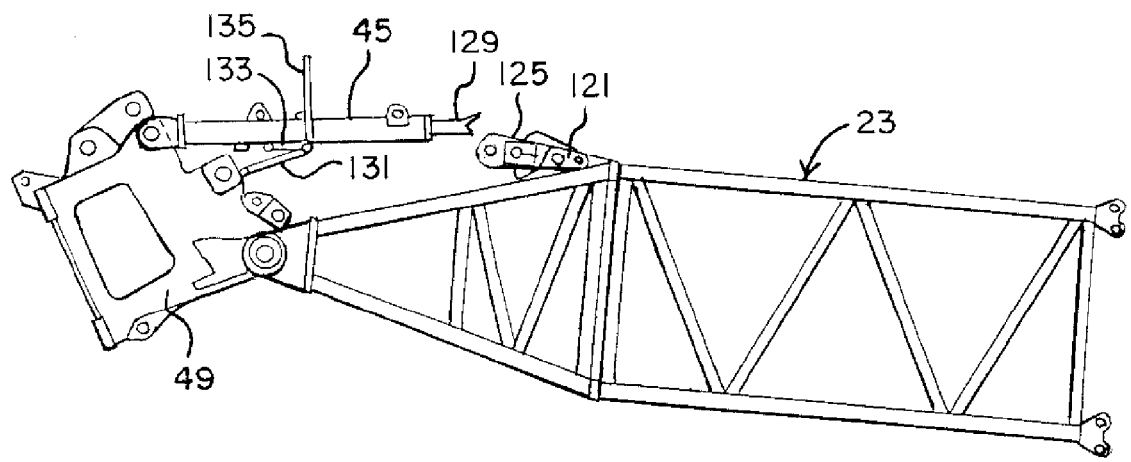
FIG. 14 is an enlarged partial side elevational view like FIG. 11, showing the boom being lowered to bring the jib to the ground, with the job stop disengaged from the jib.
Figure 15:
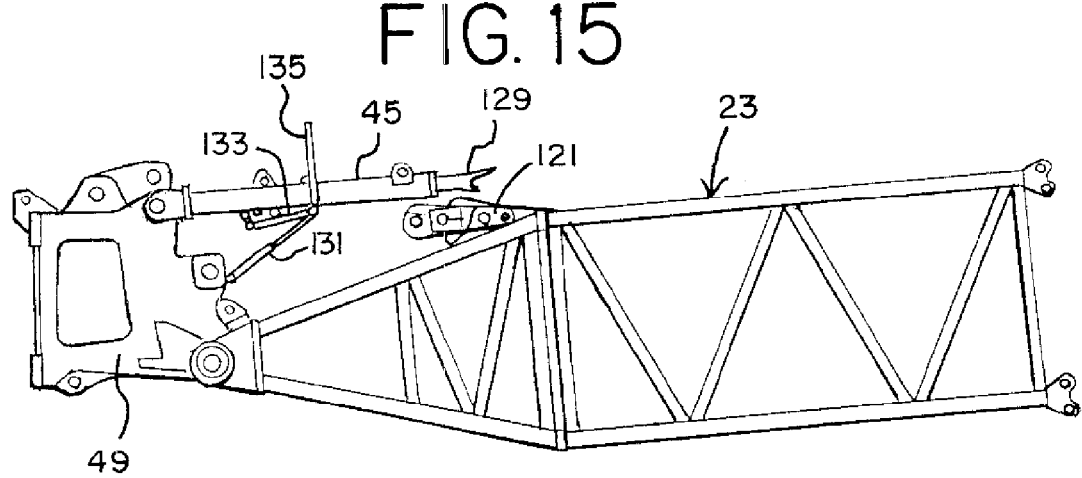
FIG. 15 is an enlarged partial side elevational view like FIG. 11, showing the jib stop disengaged and the boom and jib resting on the ground or supports.

FIGS. 14 and 15 show how the jib stop 45 is disengaged as the boom 22 and jib 23 are lowered to the ground for disassembly. When the jib 23 is at a large enough angle, such as about 30° compared to the axis of the boom (as shown in FIG. 14), even when the positioning cylinder 131 is fully retracted, the jib stop 45 will not be engaged with the jib stop engagement member on beam 125. However, to further lower the boom 22 and jib 23, the jib may go to a negative angle compared to the axis of the boom. The positioning cylinder 131 is extended, as shown in FIG. 15, to provide clearance by raising the jib stop 45 so that the jib stop is out of the way. As the jib angle goes from 30° compared to the axis of the boom as shown in FIG. 14 to about −7° as shown in FIG. 15, the positioning cylinder 131 is able to hold the jib stop 45 out of the way.

Figure 16:
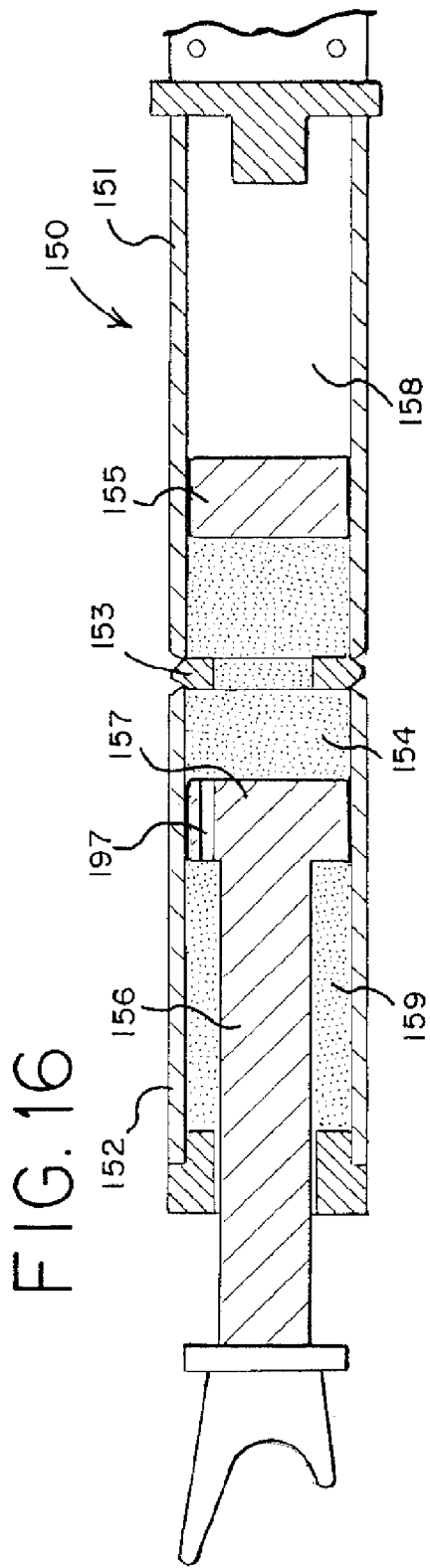
FIG. 16 is a cross-sectional view of a second embodiment of a compressible stop member of the present invention.

In addition to the boom stop 15 and jib stop 45 having a housing made of one continuous cylinder with a bore therein, the compressible stop member of the present invention may be made with other housing arrangements, as shown in FIGS. 16-19. When it is difficult to machine a housing with a long enough bore to meet the design needs for a particular compressible stop member, as shown in FIG. 16 it is possible to make the compressible stop member 150 with a housing made from two housing members 151 and 152 welded together, such as by using a weld back-up plate 153 with a double bevel weld.

The compressible stop member 150 has many similarities to boom stop 15, including a housing having a first sealed end and a second end. The internal surface of the housing comprises a first cylindrical surface having a first diameter, provided by housing member 151, and a second cylindrical surface having a second diameter provided by housing member 152. As with boom stop 15, compressible stop member 150 includes a free piston 155 slidably contained within the housing in a sealing engagement with the first cylindrical surface of the housing, producing a compressed gas chamber 158 in the housing between the free piston 155 and the first sealed end of the housing. Compressible stop member 150 includes a rod 156 having a first end and a second end, and comprising a cylindrical portion with a diameter less than the second diameter of the housing, and a rod support portion 157. The rod 156 extends out of the second end of the housing with a sliding sealing engagement at the second end of the housing. The second end of the rod is outside said housing. The rod support portion 157 is slidably contained within the housing in a sliding engagement with the internal surface of the housing. Like rod support portion 64, the rod support portion 157 separates the volume between the free piston 155 and the second end of the housing not occupied by the rod 156 into first and second liquid chambers, the first liquid chamber 154 comprising the volume inside the housing between the free piston 155 and the rod support portion 157, and the second liquid chamber 159 comprising the space between the rod support portion and the second end of the housing. The rod support portion 157 includes at least one flow channel 197 allowing liquid to flow unimpeded between the first and second liquid chambers as the rod support portion 157 slides within the housing.

In addition to the use of a two-piece housing, compressible stop member 150 differs from boom stop 15 in another significant manner. Instead of providing a rigid stop structure wherein the second end of the rod comprises a shoulder that engages the second end of the housing, compressible stop member 150 has a rigid stop provided by an internal stop located inside the housing past which the rod support portion 157 cannot move. In this case, weld back-up plate 153 has an internal diameter that is smaller than the diameter of the rod support portion 157. As rod 156 is forced into the housing, eventually rod support portion 157 will make a rigid stop against weld back-up plate 153, ending further travel of the rod. The internal diameter of weld back-up plate 153 is large enough that liquid can easily pass through it as the rod 156 is initially forced into the housing, thus causing the free piston 155 to move as the rod fills up more and more of the housing.

Figure 17:
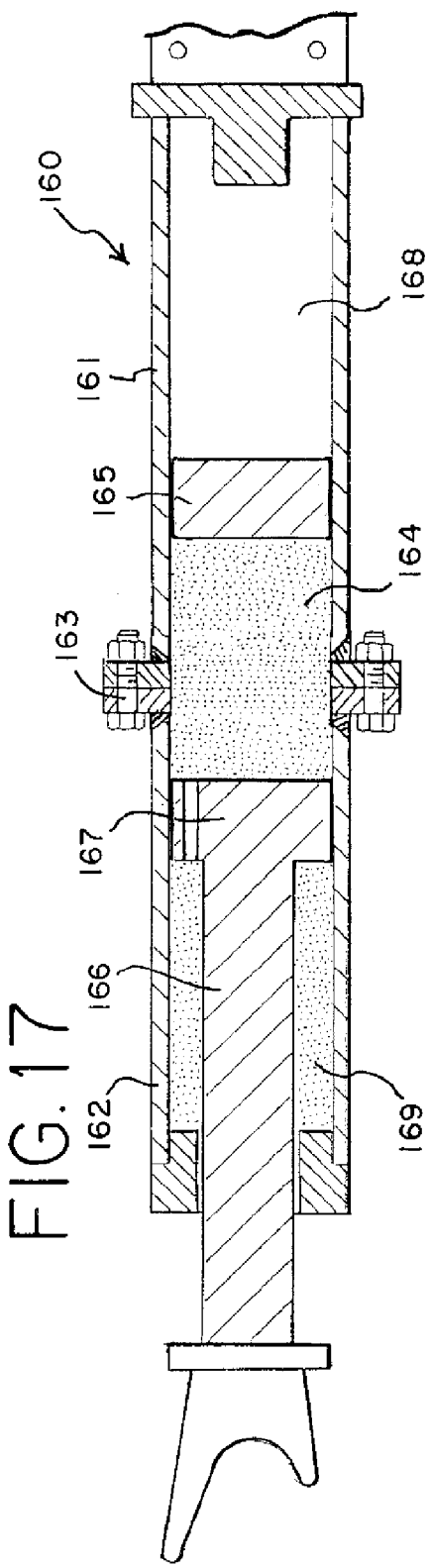
FIG. 17 is a cross-sectional view of a third embodiment of a compressible stop member of the present invention.

Another embodiment of a compressible stop member 160 having a two-piece housing is shown in FIG. 17. Compressible stop member 160 is very similar to compressible stop member 150 except that instead of using a welded connection, housing members 161 and 162 are secured together with a bolted flange connection 163. With this type of connection, the first cylindrical surface having a first diameter, provided by housing member 161, and the second cylindrical surface having a second diameter provided by housing member 162 form one continuous surface. Both the free piston 165 and the rod support portion 167 of rod 166 can slide past the joint at connection 163 if the relative amount of gas in chamber 168 and liquid in chambers 164 and 169 and the required travel of the rod allow such movement. In compressible stop member 160, the rigid stop is provided by the shoulder on rod 166 contacting the end of the housing, as in boom stop 15. Also, like boom stop 15, the amount of liquid in the housing, the configuration of the rod and the configuration of the housing are such that the compressible stop member 170 can be configured so that if the cylindrical portion of rod 166 were long enough, after rod 166 is forced into the housing to a first position (not shown), the rod and the free piston 165 will make direct physical contact with one another such that further movement of the rod a distance past the first position into the housing will directly force the free piston to move the same distance.

The first and second diameters of the internal surface of the housing do not need to be the same. Compressible stop members 170 and 180 shown in FIGS. 18 and 19 are examples of housings where these diameters are different. The internal surface of the housing of compressible stop member 170 comprises a first cylindrical surface having a first diameter, provided by housing member 171 that is smaller in diameter than the second cylindrical surface provided by housing member 172. The housing members 171 and 172 are connected by a bolted connection made between end piece 173 welded to the first housing member 171 and welded-in end portion 193 attached to second housing member 172. The functionality of compressible stop member 170 is just the same as the other embodiments. As a force is applied to rod 176, the rod moves to the right (as seen from the FIG. 18 perspective), with fluid traveling from chamber 174 to chamber 179 through flow channel 198 in rod support portion 177. Since the chamber 179 has less volume per unit of distance than chamber 174, free piston 175 is also forced to the right, increasing the pressure in chamber 178, and thus increasing the pressure of the fluid in chamber 174 acting on rod support portion 177. In compressible stop member 170 a rigid stop can be provided by either the shoulder on the end of rod 176 contacting the housing, or if the spacing is adjusted, by the rod support portion 177 contacting the welded-in end portion 193 that provides bolt holes that are used to hold the housing members together.

Compressible stop member 180 has a housing internal surface wherein the first cylindrical surface diameter provided by housing member 181 is larger in diameter than the second cylindrical surface provided by housing member 182. The connection between the housing members is provided by welds to an annular member 183. The compressible stop member 180 is different than earlier described embodiments in that an extension 195 is formed on rod 186 in front of rod support portion 187. If the extension 195 is long enough compared to the amount of liquid used, the compressible stop member 180 will display a two stage force curve when extension 195 makes it so that the rod 186 and the free piston 185 will make direct physical contact with one another, such that further movement of the rod will directly force the free piston further into chamber 188.

The preferred embodiments of the invention allow for a compact spacing of components that can produce large stopping forces and absorb large amounts of energy needed for a boom stop or a jib stop on a high capacity crane. Also, the compressible stop member can store much of the energy used to compress the member so that it can be used to help move the column member back to a normal position after the conditions are ended which compressed the stop member, or at least force the rod to follow the column member as it is moved back to its normal position.

It should be understood that various changes and modifications to the presently preferred embodiments described herein may be made. For example, the first end of the rod 77 and the rod support portion 64 could be made as one unitary piece, or the rod support portion 64 could be made of several pieces or a separate single piece secured to the outside diameter of the first end 77 of rod 76. The internal surface of the housing could have a diameter in the section where the rod support portion travels that is larger or smaller than the diameter that forms the second liquid chamber. In addition to limiting movement of column members on a crane, the compressible stop member of the present invention could be used in other applications where travel of a crane element needs to be limited, and a cushioning and return or following effect are desired. Such changes and modifications can be made without departing from the spirit and scope of the present invention and without diminishing its intended advantages. It is therefore intended that such changes and modifications be covered by the appended claims.

The invention claimed is:

1. A compressible stop member for use on a crane comprising:
   a) a housing having a first sealed end, a second end and an internal surface comprising a first cylindrical surface having a first diameter and a second cylindrical surface having a second diameter;
   b) a free piston slidably contained within the housing in a sealing engagement with the first cylindrical surface of the housing;
   c) a compressed gas chamber in the housing between the free piston and the first sealed end; and
   d) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing;
   e) the rod support portion being slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing;
   f) wherein the rod support portion includes at least one flow channel allowing liquid to flow unimpeded, with at most a negligible pressure drop, between the first and second liquid chambers as the rod support portion slides within the housing; and
   g) wherein the compressible stop member further comprises a rigid stop structure selected from the group consisting of a) the second end of the rod comprising a shoulder that engages the second end of the housing so as to limit inward movement of the rod, and b) an internal stop located inside the housing past which the rod support portion cannot move in an inward direction.

2. The compressible stop member of claim 1 wherein the sealed end of the housing includes a high pressure relief device.

3. The compressible stop member of claim 1 wherein the sealed end of the housing includes a port that can be opened to introduce gas into the compressed gas chamber.

4. The compressible stop member of claim 1 wherein the sealed end of the housing includes a port in fluid communication with a pressure gauge.

5. The compressible stop member of claim 1 wherein one of the sealed end of the housing and the second end of the rod comprises a column member engagement surface and the other of the sealed end of the housing and second end of the rod is configured for pivotal attachment to the crane.

6. The compressible stop member of claim 1 wherein the compressible stop member comprises a boom stop, and at least one extension with a hole therethrough is connected to the sealed end of the housing, allowing the housing to be pivotally connected to a crane rotating bed.

7. The compressible stop member of claim 1 wherein the rod support portion comprises a liquid piston and the at least one flow channel through the rod support portion comprises at least two unimpeded flow channels through the liquid piston.

8. The compressible stop member of claim 1 wherein the first and second internal diameters are the same, and the rod support portion is in sliding engagement with the second cylindrical surface.

9. The compressible stop member of claim 1 wherein the amount of liquid in the housing, the configuration of the rod and the configuration of the housing are such that, after the rod is forced into the housing to a first position, the rod and the free piston may make direct physical contact with one another such that further movement of the rod a distance past the first position into the housing will directly force the free piston to move the same distance.

10. The compressible stop member of claim 1 wherein the at least one flow channel in the rod support portion allows liquid to flow unimpeded between the first and second liquid chambers as the rod travels in both an inward and outward direction.

11. A compressible stop member mounted on a crane, the crane comprising a column member and the compressible stop member being selected from the group consisting of a boom stop, a jib stop, a mast stop and strut stop, the at least one compressible stop member comprising:
   a) a housing having a first sealed end, a second end and an internal surface comprising a first cylindrical surface having a first diameter and a second cylindrical surface having a second diameter;

b) a free piston slidably contained within the housing in a sealing engagement with the first cylindrical surface of the housing;

c) a compressed gas chamber in the housing between the free piston and the first sealed end; and d) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing;

e) the rod support portion being slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing;

f) wherein the rod support portion includes at least one flow channel allowing liquid to flow unimpeded between the first and second liquid chambers as the rod support portion slides within the housing; and g) wherein one of the sealed end of the housing and the second end of the rod comprises a column member engagement surface for engaging the column member and the other of the sealed end of the housing and second end of the rod is pivotally attached to the crane.

12. The compressible stop member of claim 11 wherein the column member engagement surface is U-shaped, with the open part of the U-shape facing the column member.

13. A lift crane comprising:
a) a carbody;
b) ground engaging members elevating the carbody off the ground;
c) a rotating bed rotatably connected to the carbody;
d) a boom pivotally mounted on the rotating bed; and
e) at least one compressible stop member selected from the group consisting of a boom stop, a jib stop, a mast stop and a strut stop, the at least one compressible stop member comprising:

i) a housing having a first sealed end, a second end and an internal surface comprising a first cylindrical surface having a first diameter and a second cylindrical surface having a second diameter;

ii) a free piston slidably contained within the housing in a sealing engagement with the first cylindrical surface of the housing;

iii) a compressed gas chamber in the housing between the free piston and the first sealed end; and iv) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing;

v) the rod support portion being slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing;

vi) wherein the rod support portion includes at least one flow channel allowing liquid to flow unimpeded between the first and second liquid chambers as the rod support portion slides within the housing; and vii) wherein the compressible stop member further comprises a rigid stop structure selected from the group consisting of a) the second end of the rod comprising a shoulder that engages the second end of the housing, and b) an internal stop located inside the housing past which the rod support portion cannot move in an inward direction.

14. The lift crane of claim 13 wherein the ground engaging members comprise at least two moveable ground engaging members.

15. The lift crane of claim 13 further comprising a luffing jib, and the at least one compressible stop member comprises a jib stop.

16. The lift crane of claim 13 further comprising at least one hoist drum mounted in a frame secured to the rotating bed, wherein the compressible stop member comprises a boom stop and is pivotally attached to the hoist drum frame.

17. The lift crane of claim 16 further comprising a bumper mounted on the hoist drum frame, wherein the boom stop rests on the bumper when not engaged with the boom.

18. A method of stopping a column member that is pivotally mounted on a lift crane from tipping over backward comprising:

a) providing at least one compressible stop member selected from the group consisting of a boom stop, a jib stop, a mast stop, and a strut stop, the at least one compressible stop member comprising:

i) a housing having a first sealed end, a second end and an internal surface comprising a first cylindrical surface having a first diameter and a second cylindrical surface having a second diameter;

ii) a free piston slidably contained within the housing in a sealing engagement with the first cylindrical surface of the housing;

iii) a compressed gas chamber in the housing between the free piston and the first sealed end; and iv) a rod having a first end and a second end, and comprising a cylindrical portion with a diameter less than the second diameter of the housing and a rod support portion, the rod extending out of the second end of the housing with a sliding sealing engagement at the second end of the housing, the second end of the rod being outside said housing;

v) the rod support portion being slidably contained within the housing in a sliding engagement with the internal surface of the housing, the rod support portion separating the volume between the free piston and the second end of the housing not occupied by the rod into first and second liquid chambers, the first liquid chamber comprising the volume inside the housing between the free piston and the rod support portion, and the second liquid chamber comprising the space between the rod support portion and the second end of the housing;

vi) wherein the rod support portion includes at least one flow channel allowing liquid to flow unimpeded between the first and second liquid chambers as the rod support portion slides within the housing; and vii) wherein the compressible stop member further comprises a rigid stop structure selected from the group consisting of a) the second end of the rod comprising a shoulder that engages the second end of the housing, and
b) an internal stop located inside the housing past which the rod support portion cannot move in an inward direction; and b) attaching the at least one compressible stop member to the crane with a pivotal connection and positioned so that the compressible stop member will engage the column member when the column member reaches a first angle;

c) wherein movement of the column member from said first angle to a second steeper angle causes the rod to be pushed into the housing, thereby forcing the rod support portion toward the free piston, with liquid flowing from the first liquid chamber into the second liquid chamber as the rod travels, creating an increased volume in the second liquid chamber but a decreased volume in the first liquid chamber and a commensurate increase in pressure in the gas chamber and on the rod support portion, thereby impeding the movement of the column member towards the second steeper angle, and when the column member reaches a third angle greater than the second angle, the rigid stop structure is able to prevent any further increase in the column member angle.

19. The method of claim 18 wherein when the column member moves between the first and second angle, the column member first forces the rod into the housing causing an increase of force on the rod proportional to the diameter of the cylindrical portion of the rod, until the rod is adjacent to the free piston; and then further movement of the column member causes the rod to push both the liquid and free pistons toward the sealed end of the housing, causing an increase of force on the rod proportional to the first internal diameter of the housing.

20. The method of claim 18 wherein the column member comprises a boom and the first angle is between about 75° and about 80°, and the third angle is between about 88° and about 90°.

21. The method of claim 18 wherein the third angle is the same as the second angle, the rigid stop structure comprises the rod shoulder engaging the second end of the housing, and wherein the rod shoulder comes into contact with the housing at the same rod position as when the rod is adjacent to the free piston.

* * * * *